United States Patent [19]

Kostoss et al.

[11] Patent Number: 4,837,471

[45] Date of Patent: Jun. 6, 1989

[54] DYNAMOELECTRIC MACHINE STATOR USING CYLINDRICAL KEYBAR WITH IMPROVED DOVETAIL CONFIGURATION

[75] Inventors: Joseph M. Kostoss, Schenectady; Frederick T. Rohrs, Johnstown, both of N.Y.

[73] Assignee: General Electric Company, Schenectady, N.Y.

[21] Appl. No.: 113,103

[22] Filed: Oct. 23, 1987

[51] Int. Cl.⁴ .............................................. H02K 1/12
[52] U.S. Cl. ...................... 310/258; 310/42; 310/91; 29/596
[58] Field of Search ............... 310/42, 91, 216, 217, 310/219, 51, 254, 255, 257, 258, 259; 29/596

[56] References Cited

U.S. PATENT DOCUMENTS

| 1,756,672 | 4/1930 | Barr | 310/217 |
|---|---|---|---|
| 1,795,882 | 3/1931 | Noden | 310/217 |
| 3,988,622 | 10/1976 | Starcevic | 310/91 |
| 4,051,399 | 9/1977 | Stanwick et al. | 310/51 |
| 4,103,195 | 7/1978 | Torossian et al. | 310/259 |
| 4,110,652 | 8/1978 | McGahern | 310/261 |
| 4,143,457 | 3/1979 | McGahern | 29/598 |
| 4,217,510 | 8/1980 | Detinko | 310/51 |
| 4,352,034 | 9/1982 | Karhan et al. | 310/59 |
| 4,356,419 | 10/1982 | Boer | 310/217 |
| 4,395,815 | 8/1983 | Stanley et al. | 29/598 |
| 4,445,353 | 5/1984 | Taleff et al. | 72/136 |
| 4,564,779 | 1/1986 | Terry, Jr. | 310/258 |
| 4,572,980 | 2/1986 | Anderson et al. | 310/214 |
| 4,584,497 | 4/1986 | Butman, Jr. et al. | 310/214 |
| 4,619,028 | 10/1986 | Neunschwander | 29/33 |
| 4,634,909 | 1/1987 | Brem | 310/91 |

FOREIGN PATENT DOCUMENTS

| 0166114 | 1/1986 | European Pat. Off. | 310/91 |
|---|---|---|---|
| 1130913 | 6/1962 | Fed. Rep. of Germany | 310/42 |
| 0133704 | 11/1978 | Japan | 310/91 |
| 0119362 | 5/1970 | Norway | 310/217 |
| 0194929 | 4/1967 | U.S.S.R. | 310/217 |

Primary Examiner—R. Skudy
Attorney, Agent, or Firm—Jerome C. Squillaro

[57] ABSTRACT

A dynamoelectric machine is provided with an improved stator assembly which permits a stator lamination sector to be directly placed at any desired location on the keybar dovetail which supports such sector. The keybar exhibits a unique dovetail geometry and the corresponding dovetail slot in the peripheral edge of the sector exhibits a complementary unique geometry. In this manner, the dovetail slot of the sector is mated with the keybar dovetail at any desired location on the keybar by rotating the sector onto the keybar dovetail.

10 Claims, 7 Drawing Sheets

DYNAMOELECTRIC MACHINE STATOR USING CYLINDRICAL KEYBAR WITH IMPROVED DOVETAIL CONFIGURATION

BACKGROUND OF THE INVENTION

This invention relates in general to dynamoelectric machines and, more particularly, to apparatus for connecting stator lamination sectors to the stator frame of such machines.

FIG. 1 shows a cross section of a simplified conventional dynamoelectric generator 10. Generator 10 includes a stator 12 which exhibits a generally annular shape. The outermost portion of generator 10 and stator 12 is the generator frame 13.

A stator core 14 is built up by stacking a large quantity of stator lamination sectors 16 together in sandwich-like relationship. Stator lamination sectors 16 are attached to the stator in a manner described in more detail later in this background.

A rotor 20 is rotatably mounted in a cylindrical opening 22 formed along the central axis 24 of stator 12. That is, rotor 20 is coaxially positioned within stator 12 such that rotor 20 may be freely turned with respect to stator 12. Rotor 20 and stator 12 include respective windings (not shown). External excitation power is generally supplied to the rotor field windings via slip rings (not shown) coupled to an external power source. Thus, when mechanical energy is applied to rotor 20 to cause rotor 20 to spin on its axis 24, a moving magnetic field is generated which rotates at the same rate as rotor 20. This moving magnetic field cuts across the stator windings thus causing an electric current to be generated with the stator field windings.

As background for understanding the improved structure of the present invention which mechanically couples stator core lamination sectors to the stator frame, it is helpful to understand one conventional structure for accomplishing this task. One such apparatus for attaching stator lamination sectors to a stator frame is described and claimed in U.S. Pat. No. 4,564,779, entitled "Dynamoelectric Machine Stator Using Cylindrical Keybars", issued to Terry, Jr. and assigned to the same assignee as the present invention. The disclosure of U.S. Pat. No. 4,564,779 is incorporated herein by reference.

FIG. 2 discloses a stator 30 which includes a generally annular stator frame 40, formed by outer wrapper 42 and a plurality of web plates 44 arranged in annular fashion as indicated in the portion of stator 30 shown in perspective. Keybars 50 include opposed ends, one of which is shown as 50A. A plurality of keybars 50 are situated in respective holes 52 which are machined in the radially inner edge 56 of web plates 44. Keybars 50 are used to attach lamination sectors 58 to web plates 44 as described subsequently. As seen in FIG. 2 and more clearly in the cross section of a portion of stator 30 in FIG. 3, holes 52 are bored sufficiently close to the radially inner edge 56 such that the perimeters of cylindrical bore holes 52 exhibit broken portions 59 at inner edge 56 thereof. Returning to FIG. 2, keybars 50 are oriented parallel with the central axis 57 of stator 30 and extend within holes 52 essentially from one end of stator 30 to the other. Although only a portion of a stator web plate 44 including two holes 52 is shown in FIG. 2, a complete stator 30 includes holes 52 which are equally chordally spaced around the entire radially inner edge 56 of web plates 44.

As seen in FIGS. 2 and 3, keybars 50 each have a cylindrical portion 60 which is situated within holes 52 and a dovetail portion 62 which extends radially inward from cylindrical portion 60. The dovetail portions 62 of keybars 52 mate with respective dovetail slots 64 in the radially outer curved edge 66 of stator core lamination sectors 58. That is, as seen in FIG. 3, sectors 58 actually hang from the dovetail portions 62 by the dovetail slots 64 of sectors 58 which are mated in dovetail portions 62.

For completeness of description, the portion of stator 30 shown in FIGS. 2 and 3 includes one of a plurality of stator slots 70 which contain conventional current carrying conductors 72. Stator conductors 72 are held in slots 70 by a conventional dovetail retaining bar 74.

Although only a portion of one stator core lamination sector 58 is shown in FIGS. 2 and 3, the stator core is actually built up by stacking large numbers of such sectors 58 side by side each other in sandwich-like relationship along the dovetails 62 of keybars 50. Generally, sectors 58 are segmental insulated laminations of silicon steel, each typically on the order of 10 to 20 mils thick. A close-up end view of the lower portion of one of keybars 50 is shown in FIG. 4 to illustrate in detail the dovetail portion 62 along which lamination sectors 58 are stacked.

FIG. 5A is a complete front view of one of the stator lamination sectors 58 which are stacked on keybars 50 to form the stator core. In this particular example, sector 58 includes three dovetail slots 64 (also referred to as stacking dovetails) in the radially outer edge 66 of sector 58. FIG. 5B is a close-up front view of one of the dovetail slots 64 of FIG. 5A. The dovetail slots 64 of sectors 58 and the corresponding dovetails 62 of keybars 50 enable assembly and locking of sectors 58 onto respective keybars 50.

FIG. 6 shows three adjacent sectors 58 installed on respective keybars 50. Once attached to keybar 50, each lamination sector 58 is prevented from moving radially or tangentially. As seen in FIG. 6, each sector 58 is stacked only on one keybar 50 so as to suppress circulating currents within stator 30. Since stator or armature cores generally range from approximately 5 to 25 feet long, it is not practical to stack stator lamination sectors 58 onto the keybar dovetails 62 from the ends of keybars 50 because to do so would require each sector 58 to be slid a relatively long distance along the keybar dovetail 62.

To avoid such long sliding distances, one approach is to machine stacking slots 68 at regular intervals (for example, every 12 inches) along keybar dovetail 62 as shown in the bottom view of keybar 50 in FIG. 7A. In the end view of keybar 50 shown in FIG. 7B, one of stacking slots 68 is shown as a dashed line. In this manner, stacking slots 68 provide sectors 58 with access to keybar dovetail 62 at regular intervals. Sectors 58 are inserted on keybar dovetail 62 at a stacking slot 68 and are then slid a relatively short distance along dovetail 62 to the location of any previously installed sectors. This process is continued until the stator core is completely built up.

Thus, stacking slots 68 eliminate problems associated with sliding sectors 58 large distances along keybars 50 from the keybar ends. However, a typical large generator may include up to 21 or more keybars with lengths of up to 25 feet or more. Such dimensions would typically require the machining of approximately 400 to 500 stacking slots 68 in keybars 50. Unfortunately, the machining of such a large number of stacking slots adds significantly to the cost of a generator. Even with stacking slots, stacking the stator core with sectors 58 is a very time consuming process since much of the stacker's time is spent sliding sectors 58 down the keybar 50 from stacking slots 68. Moreover, the stacker must become proficient at taking a sector 58 and placing it at just the right location so that it will become engaged on the keybar dovetail 62 through stacking slots 68. Periodically throughout the stacking process, the stator core is compressed using hydraulic presses to tighten the stator lamination sectors 58 against each other. During this pressing operation, sectors 58 typically slide for several inches along keybar dovetail 62. If a lamination sector 58 becomes caught on a particular stacking slot 68 as it is being slid past such a stacking slot in the pressing process, a loose stator core may result.

BRIEF SUMMARY OF THE INVENTION

One object of the present invention is to provide a stator assembly and method which eliminates the need for sliding stator lamination sectors long or even short distances along the keybar dovetail.

Another object of the present invention is to provide a stator assembly and method which requires less skill and less time on the part of the stacker to install stator lamination sectors on the keybar dovetail.

Another object of the present invention is to provide a stator assembly and method which eliminates the possibility of sectors becoming stuck at keybar stacking slots during the sector pressing operation.

In one embodiment of the invention, a keybar is provided for a stator of a dynamoelectric machine. The keybar includes a cylindrical portion having opposed ends and exhibiting a lengthwise dimension extending between such ends. The keybar further includes a unique substantially T-shaped dovetail portion attached to the cylindrical portion and extending between the opposed ends of the cylindrical portion and along the lengthwise dimension of the cylindrical portion.

In another embodiment of the invention, a keybar/lamination sector assembly for the stator of a dynamoelectric machine is provided which includes the keybar described above and a plurality of lamination sectors which are stackable on such keybar to form a stator core. Each lamination sector includes an edge which has a uniquely shaped dovetail slot disposed therein. The dovetail slot is shaped to mate with the dovetail portion of the keybar when the sector is rotated onto the dovetail portion at any selected location on said keybar.

In another embodiment of the invention, a stator for a dynamoelectric machine is provided which includes an annular stator frame having an inner peripheral surface, a central axis, and first and second opposed ends. The stator further includes a plurality of parallel cylindrical holes equally chordally spaced apart in the inner peripheral surface of the stator frame and extending between the first and second opposed ends of the stator frame. Each of the cylindroidal holes includes a perimeter which intersects the inner peripheral surface of the stator frame so as to form a plurality of openings from end to end of the stator frame. The stator further includes a plurality of keybars each having a cylindroidal portion and a dovetail portion. Each cylindroidal hole of the stator frame has the cylindroidal portion of a respective keybar disposed therein. The dovetail portions of the plurality of keybars extend from the plurality of openings toward the central axis of the stator frame. Each dovetail portion of the keybars is substantially T-shaped and includes a shaft which is attached to the cylindroidal portion of the keybars. Each dovetail portion further includes a cross member attached to the shaft. The crossmmember includes first and second opposed ends and first and second opposed side surfaces. The stator further includes a plurality of stator lamination sectors which are stackable on the keybars to form a stator core. Each stator lamination sector includes an edge which has a dovetail slot disposed therein. The dovetail slots are shaped to mate with the dovetail portions of the keybars.

The features of the invention believed to be novel are specifically set forth in the appended claims. However, the invention itself, both as to its structure and method of operation, may best be understood by referring to the following description and the accompanying drawings.

BRIEF DESCRIPTION OF THE DRAWINGS

FIG. 2 is a perspective view of a portion of the stator of a conventional dynamoelectric machine.

DETAILED DESCRIPTION OF THE INVENTION

Figure 1:
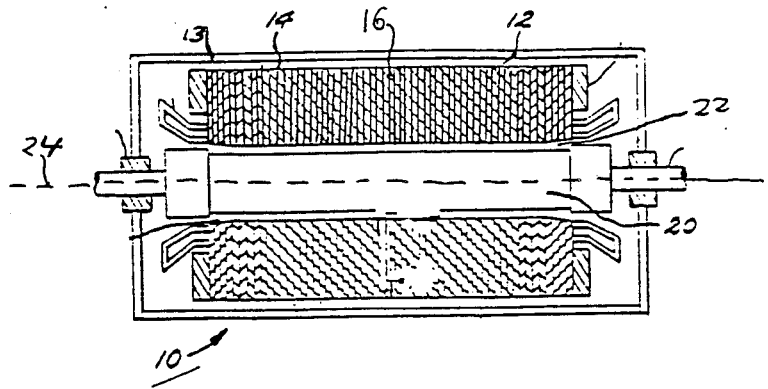
Figure 2:
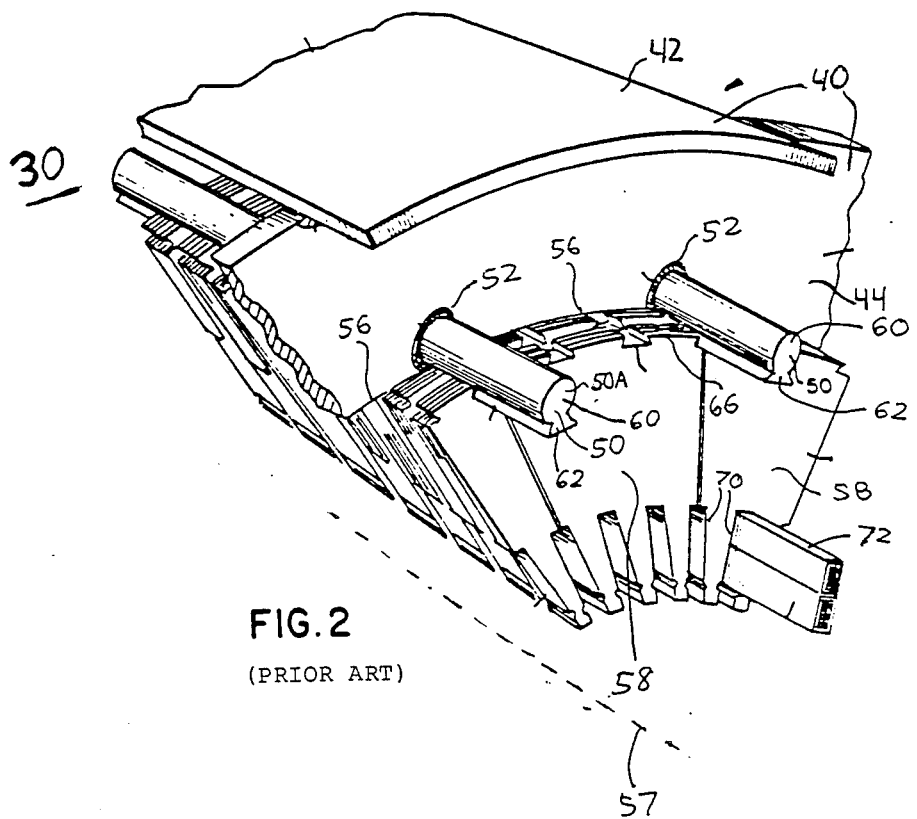
FIG. 2 is a cross-section of a conventional dynamoelectric machine.
Figure 3:
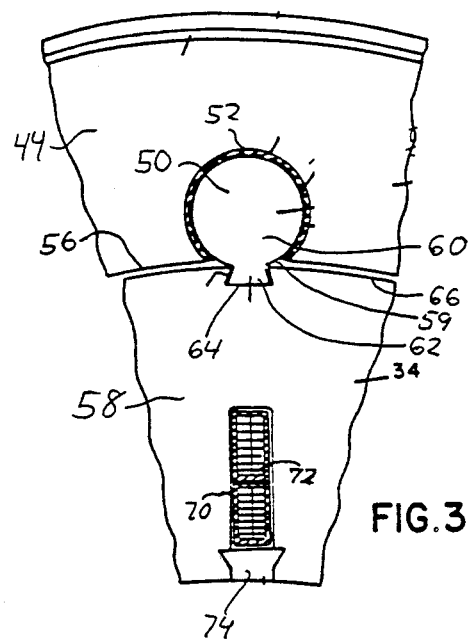
FIG. 3 is a cross section of a portion of the stator of a conventional dynamoelectric machine.
Figure 4:
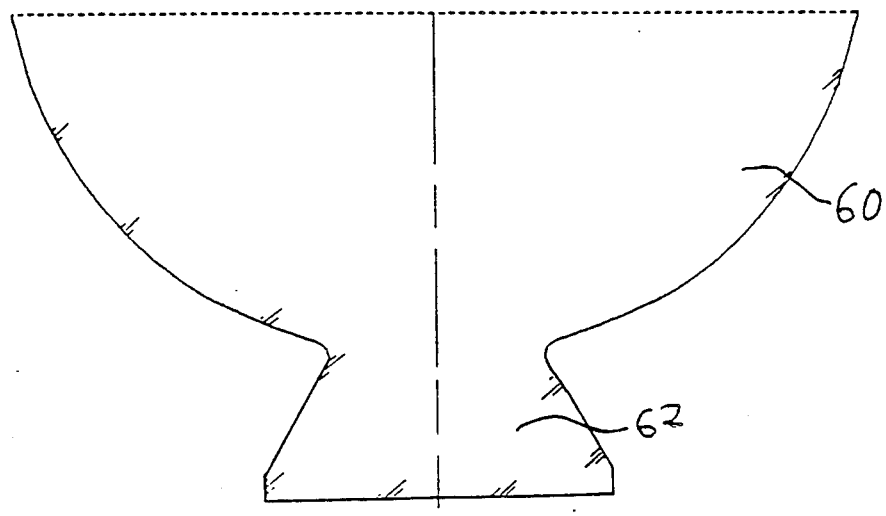
FIG. 4 is a close up side view of the lower portion of a keybar employed in the dynamoelectric machine of FIGS. 2 and 3.
Figure 5A:
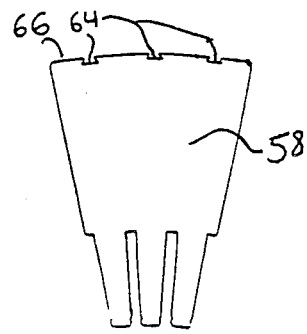
FIG. 5A is a front view of a stator lamination sector employed in the dynamoelectric machine of FIGS. 2 and 3.
Figure 5B:
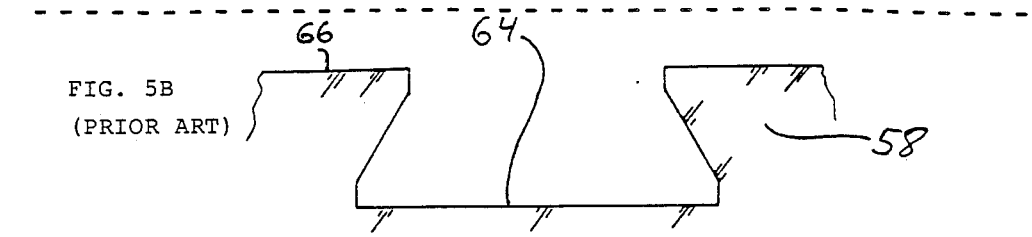
FIG. 5B is a close up front view of the dovetail slot portion of the sector of FIG. 5A.
Figure 6:
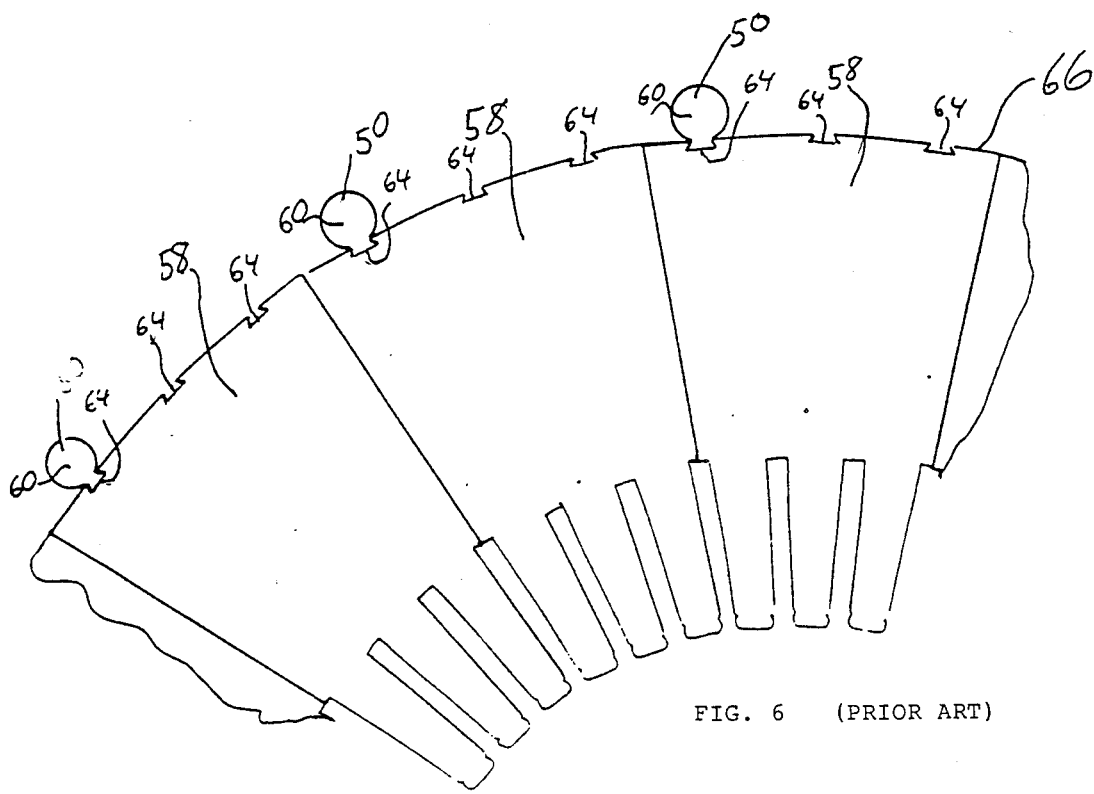
FIG. 6 is a front view of a portion of the stator of a conventional dynamoelectric machine including three stator lamination sectors attached to respective keybars.
Figure 7B:
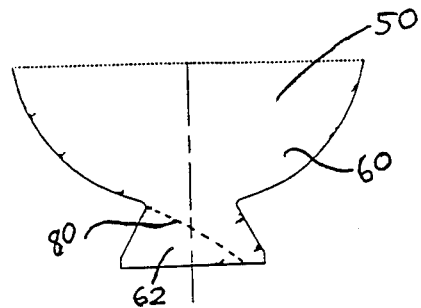
FIG. 7B is an end view of the lower portion of the keybar of FIG. 7A.
Figure 7A:
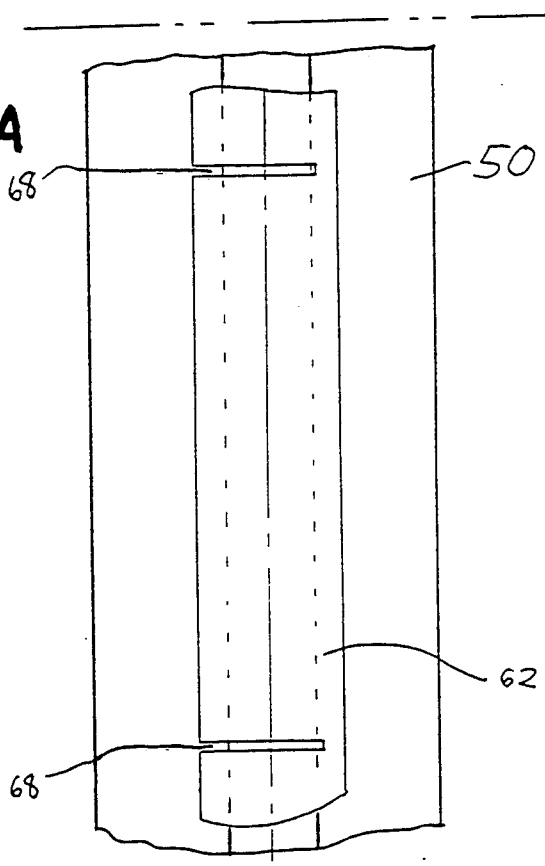
FIG. 7A is a bottom view of a keybar showing the dovetail position thereof.
Figure 8A:
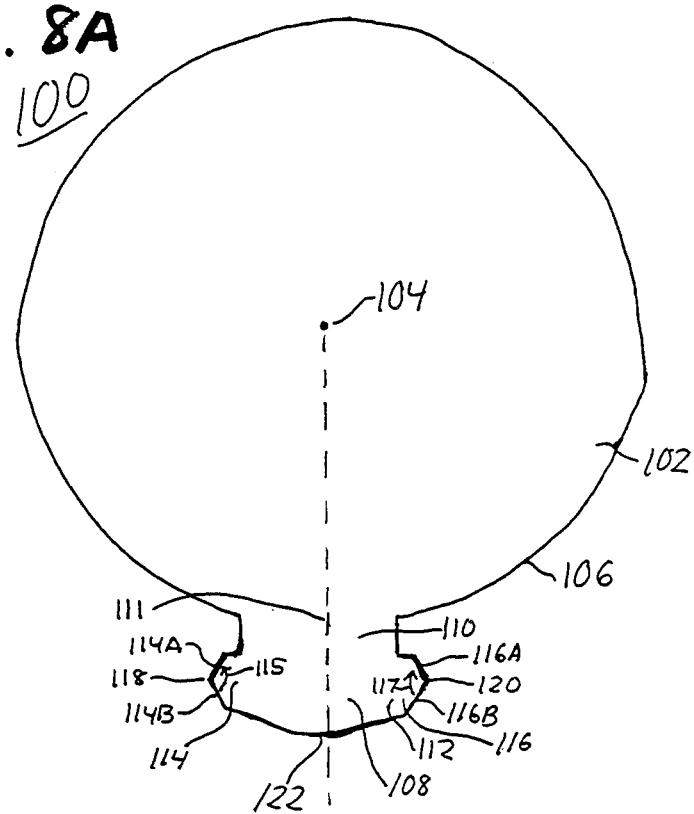
FIG. 8A is an end view of a stator keybar with a unique dovetail geometry in accordance with the present invention.

Turning now to the end view of FIG. 8A, a unique stator keybar 100 is shown for use in the stator assembly of the present invention. Keybar 100 includes a cylindroidal portion 102 having a center 104 and a circumference 106. Keybar 100 exhibits a length dimension similar to that of the keybars 50 already discussed above. Keybar 100 further includes a substantially T-shaped dovetail portion 108. Dovetail portion 108 is formed by a shaft 110 extending radially outward from circumference 106 along shaft axis 111 as shown in FIG. 8A and terminating in the elliptically shaped portion 108.

A cross member 112 is centrally situated at the end of shaft 110 opposite cylindroidal portion 102. Cross member 112 is oriented substantially perpendicular with respect to shaft 110. Cross member 112 exhibits opposed ends 114 and 116. Ends 114 and 116 are substantially V-shaped as shown in FIG. 8A. End 114 includes side surfaces 114A and 114B which are oriented in the aforementioned V-shape and which exhibit a vertex angle 115 of approximately 135 degrees in one embodiment of the invention. The vertex of V-shaped side surfaces 114A and 114B is designated vertex 118 and is oriented so as to point substantially away from axis 111. End 116 includes side surfaces 116A and 116B which are oriented in the aforementioned V-shape and which exhibit a vertex angle 117 of approximately 135 degrees in one embodiment of the invention. The vertex of V-shaped side surfaces 116A and 116B is designated vertex 120 and is oriented so as to point substantially away from axis 111. Vertices 118 and 120 point outwardly away from axis 111 in opposite directions which are substantially perpendicular to axis 111 in one embodiment of the invention. Cross member 112 includes a raised portion 122 as shown in FIG. 8A.

Figure 8B:
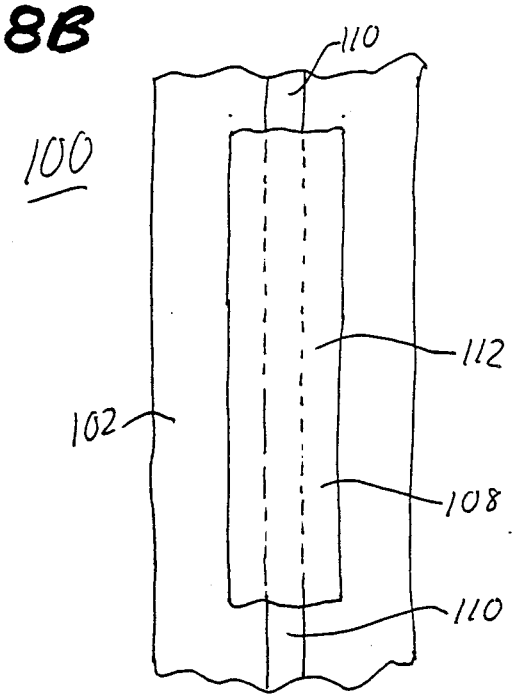
FIG. 8B is a bottom view of the keybar of FIG. 8A.

FIG. 8B is a bottom view of a portion of the keybar 100 of FIG. 8A. Dashed lines are used to indicate shaft 110 of keybar 100. Portions of cross member 112 have been cut away to more clearly show shaft 110 to which cross member 112 is connected. In one embodiment of the invention, cylindroidal portion 102, shaft 110 and cross member 112 are integrally fabricated.

Figure 9A:
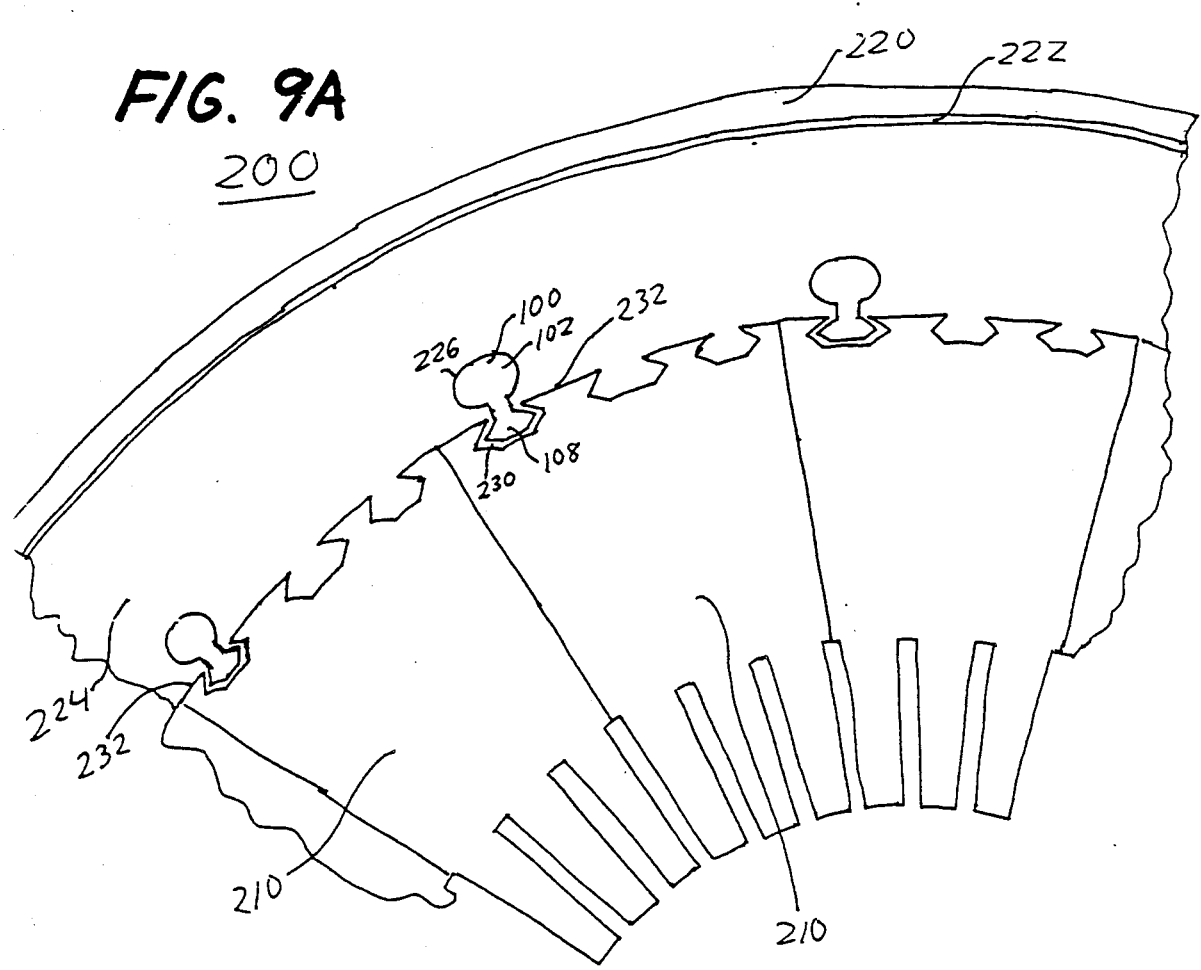
FIG. 9A is a front view of three adjacent stator lamination sectors shown mounted in a stator frame in accordance with the present invention.

FIG. 9A shows a portion of a stator 200 in which keybar 100 of FIGS. 8A and 8B is employed. In more detail, stator 200 includes a substantially cylindrical outer wrapper plate 220 which is attached via a weld bead 222 to a plurality of web plates 224 arranged in a generally annular shape to form the stator frame of a dynamoelectric machine as already described above in the background. Web plates 224 are substantially similar to web plates 44 which were described in the background of the invention. Web plates 224 include cylindroidal holes 226 which are similar to the already described holes 52 in web plates 44.

Keybars 100 are used to secure a plurality of stator core lamination sectors 210 to stator 200. That is, a keybar 100 is mounted in each of holes 226. More specifically, the cylindroidal portion 102 of each keybar 100 is situated in a respective hole 226 in the annular web plate 224 structure. The dovetail portion 108 of each keybar 100 extends radially through the broken perimeter of holes 226 as shown.

A plurality of stator lamination sectors 210 are stacked onto the dovetail portions 108 of keybars 100 as shown in FIG. 9A. Each sector 210 includes at least one dovetail slot 230 which is uniquely geometrically configured to mate with the dovetail portion 108 of keybar 100. The geometry of dovetail slot 230 is shown in more detail in FIG. 9B which is a close up front view of a portion of a stator lamination sector 210. The unique mating geometry of dovetail slot 230 permits sectors 210 to be rotated onto dovetail portion 108 of keybar 100 at any location along keybar 100 without the need for any machined access slots and without substantially sliding sector 210 once it is situated on keybar 100.

More specifically, the geometry of dovetail slot 230 is substantially similar to the geometry of keybar dovetail 108, although the geometry of dovetail slot 230 is sufficiently larger than the geometry of dovetail 108 so as to permit the former to fit within the latter. The geometry of dovetail slot 230 is generally substantially complementary with respect to the geometry of keybar dovetail 108.

Figure 9B:
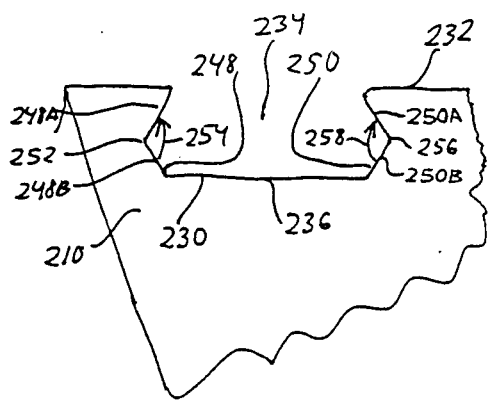
FIG. 9B is a close up front view of one dovetail slot of a stator lamination sector of FIG. 9A.

FIG. 9B shows a close up view of dovetail slot 230 which is situated on the curved radially outer edge surface 232 of sector 210. In this embodiment of the invention, dovetail slot 230 includes an opening 234 which breaks the curved outer edge surface 232 of sector 210. Dovetail slot 230 includes a substantially flat lower surface 236 opposite opening 234. Lower surface 236 is substantially parallel to the portion of curved surface 232 immediately adjacent slot 230. Dovetail slot 230 further includes opposed ends 248 and 250. Ends 248 and 250 of dovetail slot 230 exhibit a geometry sufficiently similar to the geometry of the keybar cross member ends 114 and 116, respectively, as to permit ends 248 and 250 to mate with and be held in position by keybar cross member ends 114 and 116, respectively.

In more detail, as shown in FIG. 9B, dovetail slot end 248 includes side surfaces 248A and 248B which form a V-shape having a vertex 252 and a vertex angle 254 of approximately 135 degrees in this embodiment. Dovetail slot end 250 includes side surfaces 250A and 250B which form a V-shape having a vertex 256 and a vertex angle 258 of approximately 135 degrees in this embodiment. Vertices 252 and 256 are oriented in opposite directions as illustrated.

As seen by examining FIGS. 8A and 9B side by side, vertex angles 115 and 117 of FIG. 8A are substantially similar to vertex angles 254 and 258, respectively, of FIG. 9B thus permitting dovetail slot 230 of sector 210 to be firmly mated to keybar dovetail 108 as discussed in more detail subsequently. The particular vertex angles 115, 117, 254 and 258 are given only for purposes of example and are not intended to be limiting. Other vertex angles both smaller and larger than the given vertex angles will perform satisfactorily provided the selected vertex angle achieves adequate mating of sector 210 to keybar 100. That is, the vertex angles may be smaller than the given vertex angles, provided the selected vertex angles are not so small that the structural integrity of the keybar dovetail 108/sector 210 assembly would be substantially impaired. Moreover, the vertex angles may also be larger than the given vertex angles above, provided the selected vertex angles are not so large that the sector 210 is no longer securely held to keybar 100. In addition, cross member 112 must be sufficiently long with respect to the distance between vertices 252 and 256 to assure that sector 210 is securely held in position on keybar 100 when sector dovetail slot 230 is mated with keybar dovetail 108.

To reiterate, to achieve proper mating between keybar dovetail 108 and sector slot 230, dovetail end 114 and slot end 248 exhibit substantially similar V-shaped geometries, and dovetail end 116 and slot end 250 exhibit substantially similar V-shaped geometries.

FIGS. 10A–10F illustrate the actual sequence involved in placing or stacking a stator lamination sector 210 on keybar 100. For convenience, only the portion of sector 210 containing dovetail slot 230 is shown, and only the portion of keybar 100 which includes dovetail portion 108 is shown. In the subsequent discussion, the side of dovetail slot 230 which contains side surfaces 248A and 248B is referred to as the left side of dovetail slot 230, while the side of dovetail slot 230 which contains side surfaces 250A and 250B is referred to as the right side of dovetail slot 230. The side of keybar dovetail portion 108 which contains side surfaces 114A and 114B is referred to as the left side of keybar dovetail portion 108, while the side of keybar dovetail portion 108 which contains side surfaces 116A and 116B is referred to as the right side of keybar dovetail portion 108.

The unique geometry of sector 210 and keybar 100 permit the stacker to directly position a stator lamination sector 210 at any particular position on keybar 100 without sliding the sector 210 along the keybar 100 to reach that location. The stacker accomplishes this by rotating sector 210 onto keybar 100 as shown in the sequence of FIGS. 10A–10F.

Figure 10A:
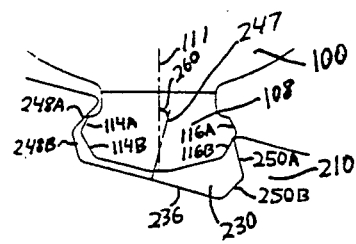
FIGS. 10A–10F are front views showing the successive steps used in positioning the sector of FIGS. 9A and 9B onto the stator keybar of FIG. 8A.

In more detail, as seen in FIG. 10A, the stacker orients sector 210 such that the left side of dovetail slot 230 is situated in contact with the left side of dovetail portion 108. That is, the left side of dovetail portion 108 is within dovetail slot 230 and the V-shaped side surfaces 114A and 114B are adjacent V-shaped side surfaces 248A and 248B, respectively, as shown. The stacker then orients sector 210 at a small acute angle 260 with respect to keybar 100. The small acute angle 260 referred to above is the angle formed between axis 111 of keybar 100 and the perpendicular bisector 247 of lower surface 236 of dovetail slot 230. It is noted that perpendicular bisector 247 is also the central axis of slot 230. At this point, dovetail side surface 116B has entered slot 230, but dovetail side surface 116A has not yet entered slot 230.

Figure 10B:
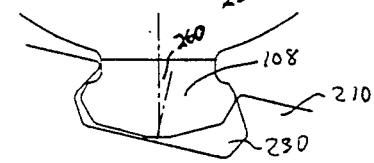

The stacker then rotates sector 210 counterclockwise (thus decreasing acute angle 260) until side surface 116A begins to enter the right side of dovetail slot 230 as seen in FIG. 10B.

Figure 10C:
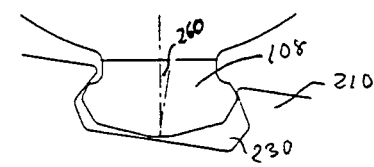
Figure 10D:
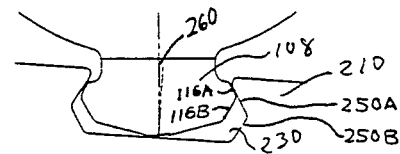
Figure 10E:
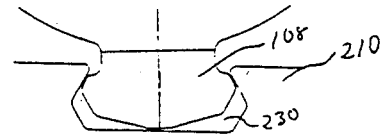
Figure 10F:
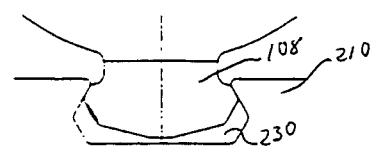

As shown in FIGS. 10C–10D, the stacker then continues to rotate sector 210 counterclockwise until dovetail surface 116A has entered sector slot 230 and dovetail surface 116A is substantially parallel and in contact with slot side surface 250A as shown in FIG. 10D. The stacker continues to rotate sector 210 counterclockwise until acute angle 260 is decreased to approximately zero degrees as shown in FIG. 10F. In this final position, both radial and tangential motion of the stator lamination sector 210 is limited by the clearances between the sector dovetail slot 230 and the keybar dovetail portion 108.

Although in the example above, sector 210 is attached to keybar 100 by situating the left side of sector slot 230 onto the left side of keybar 100 and then rotating sector 230 counterclockwise, those skilled in the art will appreciate that sector 210 may also be attached to keybar 100 by situating the right side of sector slot 230 onto the right side of keybar 100 and then rotating sector 210 clockwise.

While an improved stator apparatus has been described in detail above, those skilled in the art will appreciate that a method for assembling stator lamination sectors to a keybar is also described. For completeness, the disclosed method is summarized as including the step of positioning the sector at any desired location along the keybar. The method further includes the step of positioning the sector such that a first end of the cross member of the keybar is within the dovetail slot of the sector and such that the first V-shaped side surface of the sector is adjacent the first end of the cross member of the keybar at the desired location along the keybar. The method includes the step of rotating the second V-shaped side surface of the sector toward the second end of the cross member of the keybar until the dovetail portion of the keybar is within the dovetail slot of the sector. Once this position is reached the sector is securely held to the keybar.

In summary, the foregoing has described an improved stator apparatus and assembly method which eliminate the requirement of sliding stator lamination sectors along the keybar dovetail in order to locate the sectors at their proper locations. The stator assembly of the present invention requires less skill and less time on the part of the sector stacker to install stator lamination sectors on the keybar dovetail. Moreover, the stator assembly of the present invention eliminates the possibility of sectors becoming stuck at keybar dovetail access slots during the sector pressing operation, since the need for such slots has been eliminated.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A keybar for a stator of a dynamoelectric machine comprising:
    a cylindroidal portion having opposed ends and exhibiting a lengthwise dimension extending between said ends;
    a substantially T-shaped dovetail portion attached to said cylindroidal portion and extending between said opposed end along the lengthwise dimension of said cylindroidal portion;
    a shaft having opposed ends included within the T-shaped portion, said shaft being attached to said cylindroidal portion and extending substantially from end to end of said cylindroidal portion along the lengthwise dimension of the cylindroidal portion;
    a cross member attached to said shaft along a lengthwise dimension, said cross member being substantially perpendicular to said shaft; and,
    opposed V-shaped side surfaces included within the cross member and extending substantially from end to end of said cross member.

2. A keybar/lamination sector assembly for stator of a dynamoelectric machine comprising:
    a keybar having a cylindroidal portion having opposed ends and exhibiting a lengthwise dimension extending between said ends;
    a substantially T-shaped dovetail portion attached to said cylindroidal portion of said keybar and extending between said opposed ends along the lengthwise dimension of said cylindroidal portion, and
    a plurality of lamination sectors being stackable on said keybar to form a stator core, each lamination sector including an edge which has a dovetail slot disposed therein, said dovetail slot being shaped to mate with the dovetail portion of said keybar such that said sector may be rotated onto said dovetail portion at any selected location on said keybar.

3. The keybar/lamination sector assembly of claim 2 wherein said T-shaped dovetail portion includes a shaft having opposed ends, said shaft being attached to said cylindroidal portion and extending from end to end of said cylindroidal portion along the lengthwise dimension of said cylindroidal portion.

4. The keybar/lamination sector assembly of claim 3 wherein said T-shaped dovetail portion includes a cross member attached to said shaft along the lengthwise dimension thereof and extending from end to end of said shaft, said cross member being situated substantially perpendicular to said shaft.

5. The keybar/lamination sector assembly of claim 2 wherein the dovetail slot of said lamination sector includes firs and second opposed V-shaped side surfaces with respective vertices facing away from each other.

6. The keybar/lamination sector assembly of claim 5 wherein the dovetail slot of said lamination sector includes a lower surface substantially parallel to said edge surface and joining said V-shaped side surfaces.

7. A stator for a dynamoelectric machine comprising:
an annular stator frame including an inner peripheral surface, a central axis, and first and second opposed ends;
a plurality of parallel cylindroidal holes equally chordally spaced apart in the inner peripheral surface of said stator frame and extending between the first and second opposed ends of said stator frame;
each of said cylindroidal holes having a perimeter which intersects the inner peripheral surface of said stator frame to form a plurality of openings from end to end of said stator frame;
a plurality of keybars each having a cylindroidal portion and a dovetail portion, each cylindroidal hole of said stator frame having the cylindroidal portion of a respective keybar disposed therein, the dovetail portions of said plurality of keybars extending from said plurality of openings toward the central axis of said stator frame;
each dovetail portion of said keybars being substantially T-shaped and including a shaft which is attached to the cylindroidal portion of said keybars, each dovetail portion further including a cross member attached to said shaft, said cross member having first and second opposed side surfaces, the first and second side surfaces of the cross member being V-shaped and oriented such that said first and second ends point away from said shaft, and
a plurality of stator lamination sectors being stackable on said keybars to form a stator core, each stator lamination sector including an edge which has a dovetail slot disposed therein, said dovetail slots being shaped to mate with the dovetail portions of said keybars.

8. The apparatus of claim 7 wherein the V-shape of said first and second ends of said cross member exhibits a vertex angle of approximately 135 degrees.

9. The apparatus of claim 7 wherein said cross member includes a raised portion extending outward away from said shaft, said raised portion being situated substantially at the center of said cross member.

10. A keybar/lamination sector assembly for a stator of a dynamoelectric machine comprising:
a keybar having a cylindroidal portion having opposed ends and exhibiting a lengthwise dimension extending between said ends;
a substantially T-shaped dovetail portion attached to said cylindroidal portion of said keybar and extending between said opposed ends along the lengthwise dimension of said cylindroidal portion, said T-shaped dovetail portion including a cross member, said cross member having opposed V-shaped side surfaces extending from end-to-end of said cross member; and
a plurality of lamination sectors being stackable on said keybar to form a stator core, each lamination sector including an edge which has a dovetail slot disposed therein, said dovetail slot being shaped to mate with the cross member on the dovetail portion of said keybar such that said sector may be rotated onto said cross member at any selected location on said keybar.

* * * * *